United States Patent [19]

Fekete

[11] Patent Number: 4,485,466
[45] Date of Patent: Nov. 27, 1984

[54] STYLUS SHIELDING AND UNSHIELDING APPARATUS FOR A PHONOGRAPH

[75] Inventor: Ferenc Fekete, Huntington Beach, Calif.

[73] Assignee: Mattel, Inc., Hawthorne, Calif.

[21] Appl. No.: 455,689

[22] Filed: Jan. 5, 1983

[51] Int. Cl.³ .............................................. G11B 3/40
[52] U.S. Cl. ...................................... 369/177; 369/63
[58] Field of Search ............................. 369/63, 67, 177

[56] References Cited

U.S. PATENT DOCUMENTS

| 3,224,782 | 12/1965 | Isemura | 369/177 |
| 3,720,011 | 3/1973 | May | 40/28.2 |
| 4,123,065 | 10/1978 | Watanabe | 274/9 B |
| 4,286,789 | 9/1981 | Watanabe | 369/67 |
| 4,332,023 | 5/1982 | Okamura et al. | 369/177 |

OTHER PUBLICATIONS

Page 88 of the 1975 catalog of the Kenner Toys division of General Mills, Inc.

Primary Examiner—Steven L. Stephan
Attorney, Agent, or Firm—Ronald M. Goldman; Max E. Shirk; James G. O'Neill

[57] ABSTRACT

The upwardly-extending reproducing stylus (100) is shielded within opening (24) in phonograph (16) when recorded-message carrier (12) is not in playing position by a cover member (246). A cam (256) unshields stylus (100) and exposes it in an arcuate slot (244) when a pin (274) on recorded-message carrier (12) exerts a downward force on cam (256) during the coupling of carrier (12) to opening (24) by engaging annular groove (290) with detents (44, 46, 48).

9 Claims, 8 Drawing Figures

STYLUS SHIELDING AND UNSHIELDING APPARATUS FOR A PHONOGRAPH

DESCRIPTION

1. Technical Field

The present invention relates to phonographs and more particularly, to a new and useful stylus-shielding apparatus and a stylus-unshielding apparatus in combination with a phonograph and improved recorded-message carrier.

Certain phonographs are of the type which include a housing having a top wall provided with an opening for receiving a recorded-message carrier. A turntable is rotatably mounted in the housing in alignment with the opening and a tonearm is pivoted to the turntable for rotation thereby. Such phonographs include a reproducing stylus extending upwardly from the tonearm for engaging the recorded-message carrier when it is in position within the opening. When the recorded-message carrier is removed from the phonograph, the sharp end of the stylus is exposed to the opening. This exposure may present a safety hazard to small children playing with the phonograph.

2. Background Art

The prior art, page 88 of the 1975 catalog of the Kenner toy division of General Mills, Inc., discloses a phonograph of the type which includes a housing having a top wall provided with an opening for receiving a recorded-message carrier in the form of a cube. The turntable is rotatably mounted in the housing in alignment with the opening and a tonearm is pivoted to the turntable for rotation thereby. The phonograph also includes a reproducing stylus extending upwardly from the tonearm for engaging a recorded message provided on each face of the cube.

Additionally, U.S. Pat. No. 4,123,065 discloses a phonograph for use with a record cartridge wherein a disc record is attached to a sheet-like record holder. The phonograph comprises a cartridge holder mounted on a housing for immovably holding the record cartridge with its record facing downwardly. Within the casing, a motor-driven turntable is rotatably mounted under the cartridge holder and a speaker cone is mounted further under the turntable in concentric, back-to-back relationship for simultaneous rotation therewith. A tonearm is pivoted eccentrically on the turntable and has a reproducing stylus extending upwardly therefrom for engagement with a record groove on the record cartridge. The vibrations set up in the reproducing stylus during rotation of the turntable relative to the record cartridge are transmitted to the speaker cone via a vibration transmitter rod mounted on the turntable.

U.S. Pat. No. 3,720,011 discloses a doll stand having a phonograph record for a base and a doll-leg-engaging member connected to the base so that a doll may be mounted on the doll stand and rotated during playing of the record on a phonograph turntable. The doll-leg-engaging member may be connected to either side of the record so that both sides may be played with the doll in position thereon.

DISCLOSURE OF INVENTION

In accordance with the present invention, a new and useful phonograph stylus-shielding apparatus and a stylus-unshielding apparatus are provided in combination with a phonograph and improved recorded message carrier. The phonograph includes a housing having a top wall provided with an opening for receiving the improved recorded-message carrier. A turntable is rotatably mounted in the housing in alignment with the opening and a tonearm is pivoted to the turntable for rotation thereby. A reproducing stylus extends upwardly from the tonearm for engaging the recorded-message carrier when it is in position within the opening. The stylus-shielding apparatus automatically shields the stylus from access through the opening when the recorded-message carrier is removed from the opening and the stylus-unshielding apparatus automatically unshields the stylus when the recordedmessage carrier is positioned within the opening. The recorded-message carrier includes a disc portion having a message recorded thereon and a depending member which actuates an unshielding member when the recorded-message carrier is positioned within the opening.

The stylus-shielding apparatus of the present invention has the advantage that the sharp point of the upstanding stylus is not accessible to tender fingers when the recorded-message carrier is not in position within the opening.

The unshielding apparatus has the advantage of automatically moving the stylus to a position where it engages the recorded portion of the disc when the recorded-message carrier is positioned within the opening.

BRIEF DESCRIPTION OF THE DRAWINGS

The details of the present invention will be described in connection with the accompanying drawings, wherein.

BEST MODE FOR CARRYING OUT THE INVENTION

Figure 1:
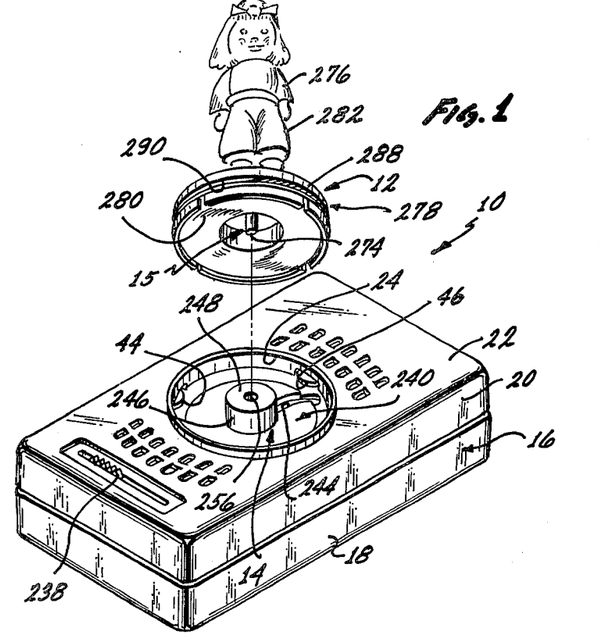
FIG. 1 is a perspective view of a phonograph and recorded-message carrier of the present invention.
Figure 4:
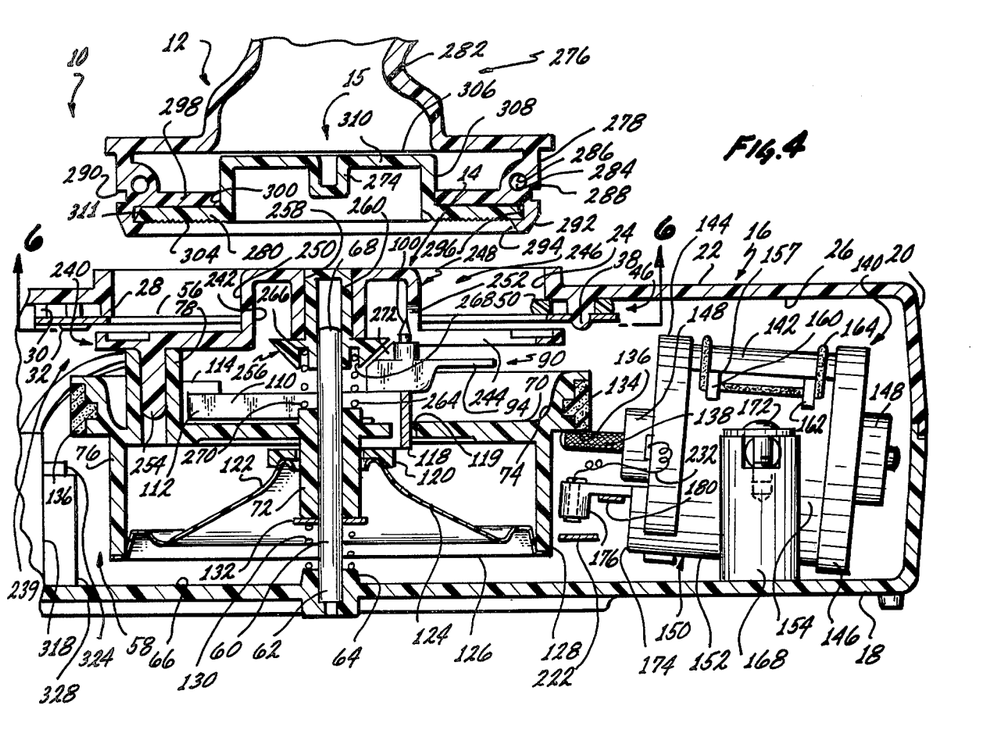
FIG. 4 is a partial view similar to FIG. 3, but showing the recorded-message carrier and internal phonograph parts as they appear before the recorded-message carrier is coupled to the phonograph.

Referring again to the drawings, and more particularly, to FIGS. 1 and 4, a combination constituting a presently-preferred embodiment of the invention, generally designated 10, includes a recorded-message carrier 12, a stylus-shielding apparatus 14 and a stylus-unshielding apparatus 15. Apparatus 14 is provided in a phonograph 16 having a lower housing portion 18 and an upper housing portion 20. Upper housing portion 20 is provided with a top wall 22 having an opening 24 provied therein.

Figure 6:
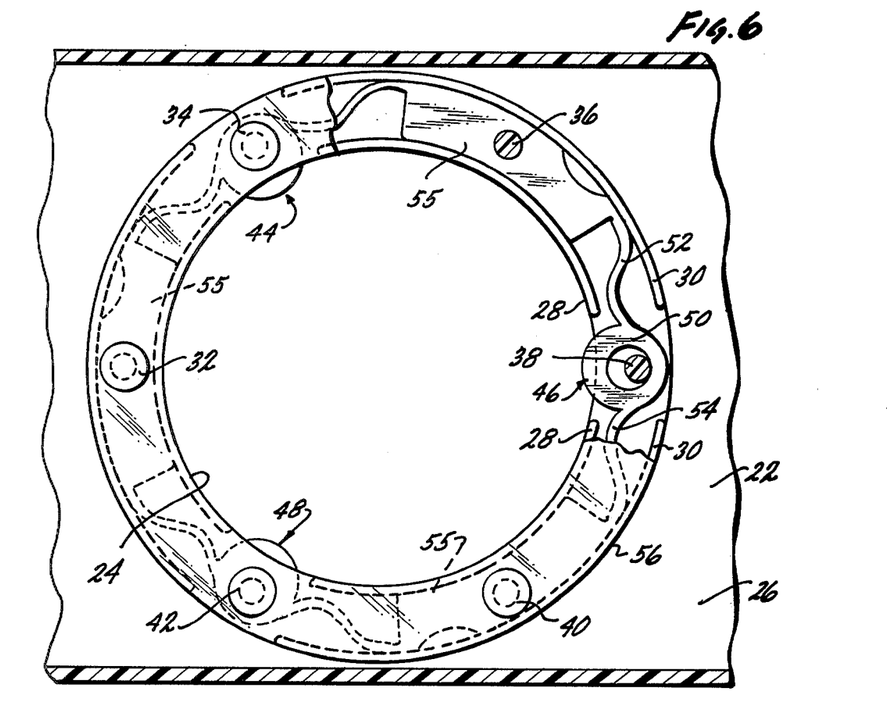
FIG. 6 is an enlarged, partial cross-sectional view taken along line 6—6 of FIG. 4 with parts broken away to show internal construction.

Referring now to FIGS. 1, 3, 4 and 6, top wall 22 includes an underside 26 to which a pair of spaced annular ribs 28, 30 and a plurality of pins 32, 34, 36, 38, 40 and 42 (FIG. 6) are affixed by molding them integrally with upper housing portion 20 from a suitable polymeric material. Suitable detents 44, 46, 48 are mounted to pins 34, 38 and 42, respectively, for securing recorded-message carrier 12 in position within opening 24. As best seen in FIG. 6 for the detent 46, each detent includes a torus shaped body portion 50 from which a pair of flexible fingers 52, 54 extend laterally into engagement with annular rib 30 for biasing the detent inwardly toward opening 24. Detents 44, 46 and 48 may be moulded from an engineering-type acetal as a one-piece assembly including a carrier 55 which may be mounted to the underside 26 of top wall 22 by interrupting ribs 28, 30 and by affixing a retainer ring 56 to pins 32, 34, 36, 38, 40 and 42. Ring 56 may be affixed to the pins by staking them in a manner well known to those skilled in the art.

Referring now to FIGS. 2, 3, 4 and 8, phonograph 16 includes a turntable 58 which may be rotatably mounted to a spindle 60 in a lower housing portion 18 in alignment with opening 24. Spindle 60 includes a lower end 62, which is mounted in a hollow boss 64 provided in bottom wall portion 66 of lower housing portion 18, and an upper end 68.

Turntable 58 includes a circular platform 70 to which is affixed a cylindrical bearing 72 for rotatably mounting turntable 58 on spindle 60. Turntable 58 also includes an upstanding rim 74 and a depending, cylindrical skirt 76. A plurality of hollow, cylindrical bosses 78, 80, 82, 84 may be provided on platform 70 (FIG. 8) for a purpose to be hereinafter described. Platform 70 also carries a tonearm post 86 and a spring stop 88.

Figure 8:
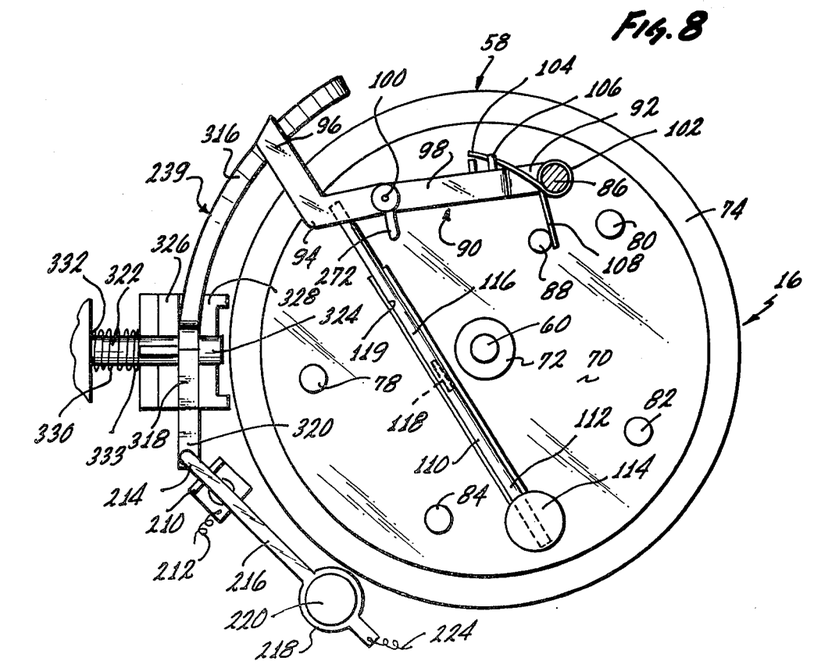
FIG. 8 is an enlarged, top plan view of the turntable portion, and associated parts, of the phonograph of FIG. 1.

Phonograph 16 also includes a tonearm assembly 90 having a first end 92 rotatably mounted to tonearm post 86. Tonearm assembly 90 includes a second end 94, from which a switch-opening cam 96 extends, and an intermediate portion 98, to which an upstanding sound-reproducing stylus or needle 100 is affixed. Tonearm 90 is biased to the center of turntable 58 by a torsion spring 102 which encompasses tonearm post 86. Spring 102 includes a first leg 104, which is coupled to a clip 106 carried by tonearm 90, and a second leg 108, which engages spring stop 88 (FIG. 8).

Figure 3:
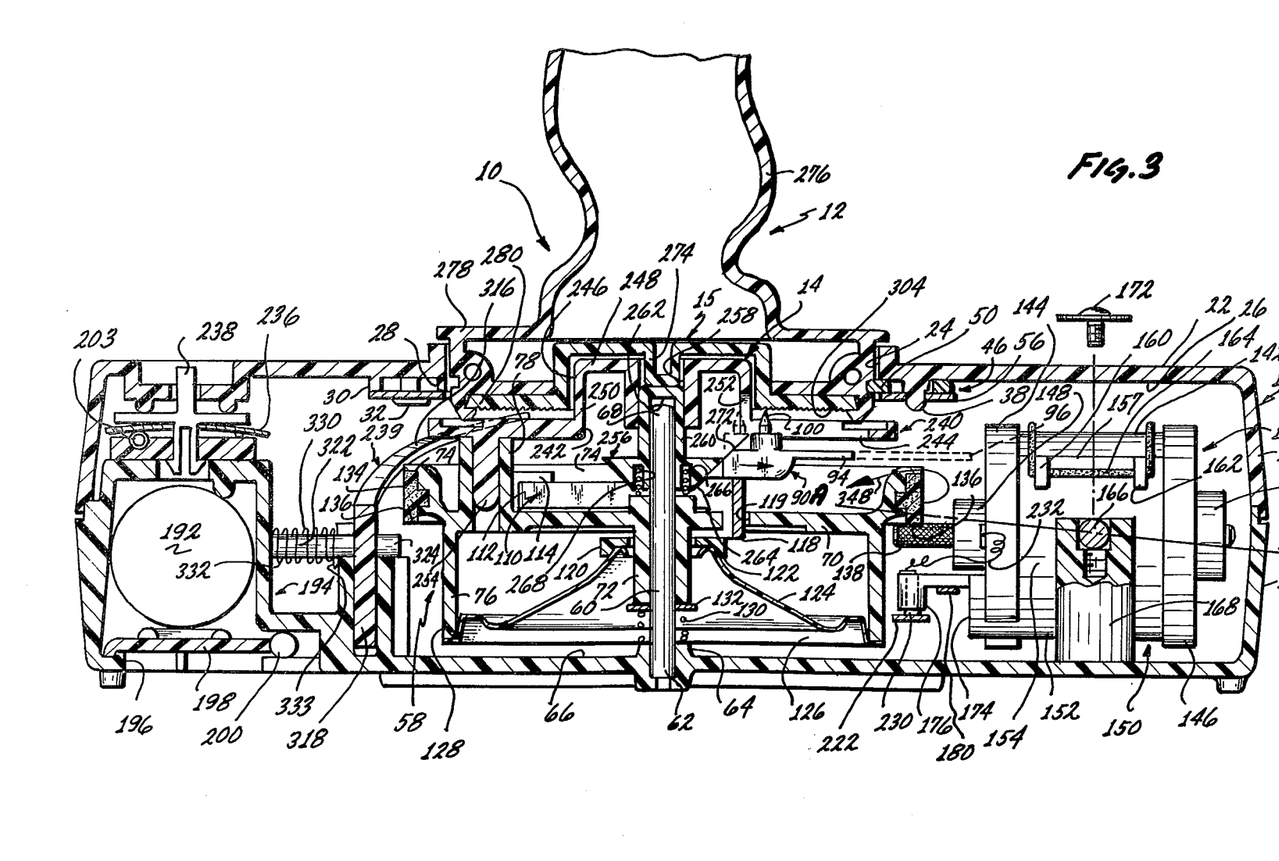
FIG. 3 is a cross-sectional view, on an enlarged scale, of the phonograph and recorded-message carrier of FIG. 1 as viewed along line 3—3 of FIG. 2.

Tonearm 90 may be molded from a suitable polymeric material and rides on a metal sound-transmitting rod 110 having a first end 112 affixed to turntable 58 by a suitable fastener 114. Sound-transmitting rod 110 also has an intermediate portion 116 from which a coupler 118 depends through an opening 119, which is provided in platform 70 (FIG. 8), into engagement with a sound-transmitting armature 120 (FIGS. 3 and 4). Armature 120 encompasses cylindrical bearing 72 and is affixed to the small end 122 of a speaker cone 124. Speaker cone 124 is mounted inside of depending skirt 76 and has its large-diameter end 126 affixed to the lower edge 128 of skirt 76.

As best seen in FIGS. 3 and 4, turntable assembly 58 is biased upwardly in phonograph 16 by a first compression spring 130 which encompasses the lower end 62 on spindle 60 for exerting a force between boss 64 and a washer 132 encompassing spindle 60 below cylindrical bearing 72.

Phonograph 16 also includes an elastomeric drive belt 134 (FIGS. 3, 4 and 7) which encompasses upstanding rim 74 on turntable 58 and which includes a lower edge 136 engageable with a knurled output shaft 138 on an electric motor 140 for driving turntable 58.

Figure 5:
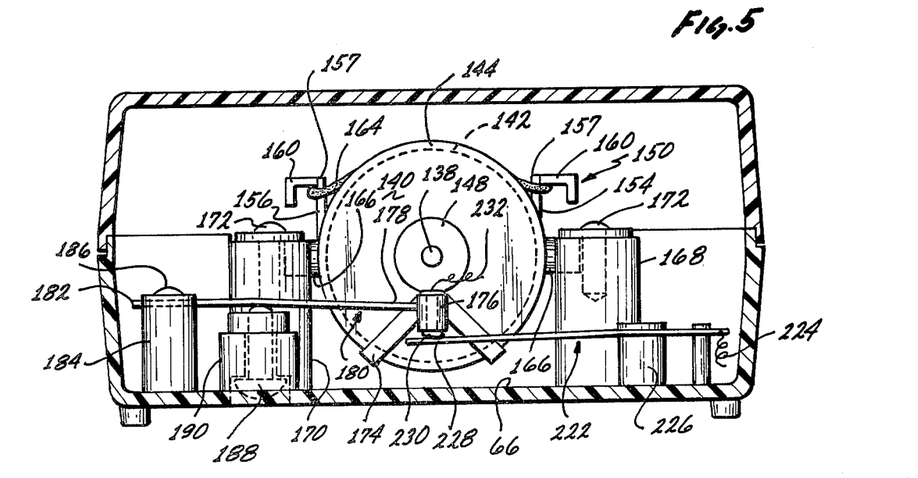
FIG. 5 is a cross-sectional view, on an enlarged scale, of the phonograph of FIG. 1 as viewed along lines 5—5 of FIG. 2.

Referring now to FIGS. 2-5, motor 140 includes a housing 142 which is closed by a front end cap 144 and a rear end cap 146. End caps 144, 146 each is provided with a bearing 148 for journalling output shaft 138. Motor 140 is mounted in a U-shaped cradle 150 having a bight portion 152 and a pair of upstanding legs 154, 156, each terminating in an upper end 157 to which is affixed a pair of spacedapart clips 160, 162. Motor 140 may be retained in position in cradle 150 by an elastomeric endless band 164 engaging clips 160, 162 on each leg 154, 156. A trunion 166 is affixed to each leg 154, 156 for swingably mounting motor 140 on a pair of posts 168, 170 affixed to the bottom wall 66 of housing portion 18. Each trunion 166 is retained in position on its post by screw 172. A V-shaped yoke 174 (FIG. 5) is affixed to the front of cradle 150 and carries an inverted L-shaped member 176 at its apex. Member 176 is engaged by one end 178 of leaf spring 180 having its other end 182 mounted to a post 184 by a screw 186. Spring 180 normally biases motor 140 to the position shown in FIG. 4, as represented by line A—A in FIG. 3. As shown in FIG. 5, the normal position of motor 140 may be adjusted by an adjusting screw 188 threadedly engaging an internally-threaded boss 190 affixed to bottom wall 66.

Figure 2:
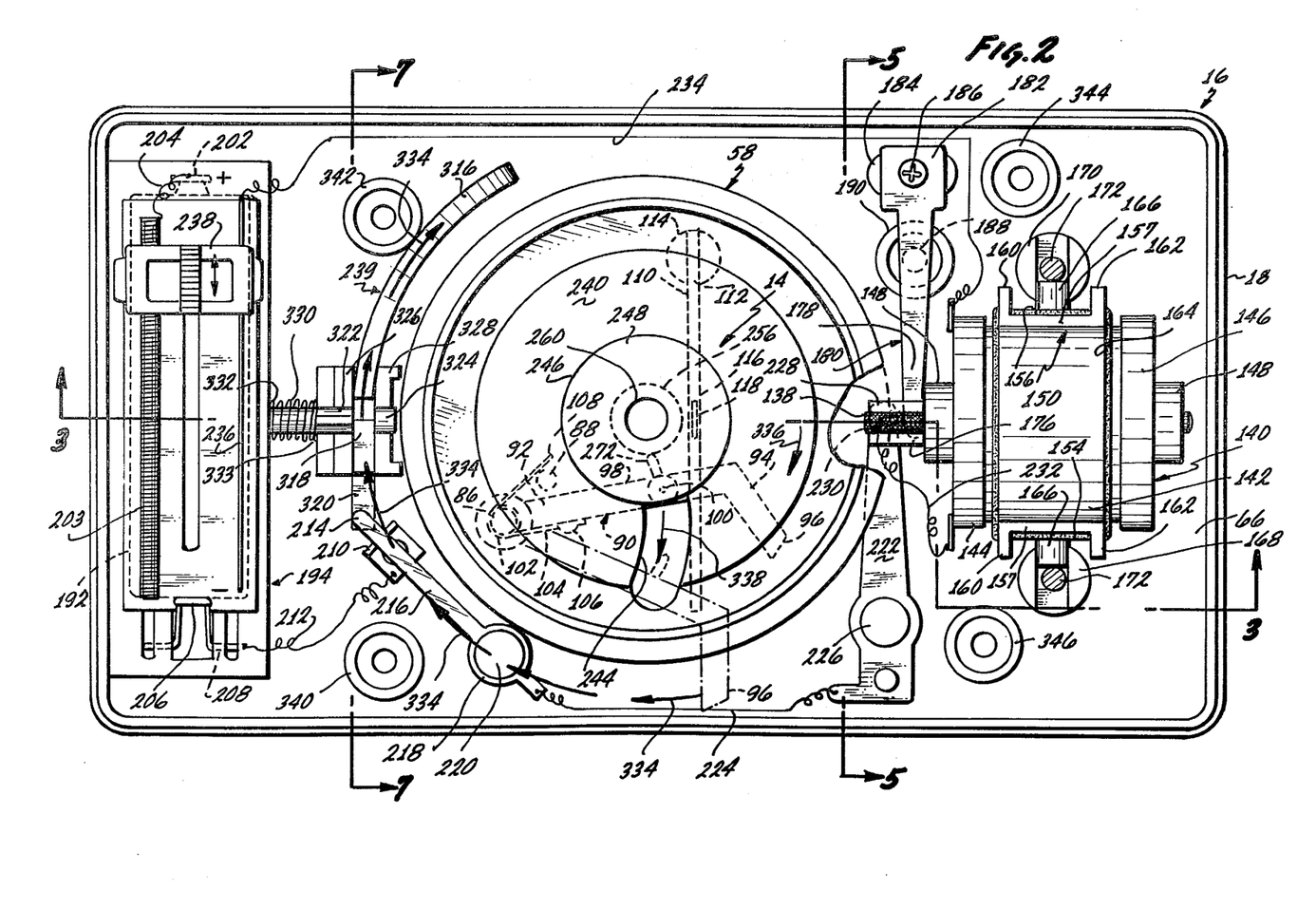
FIG. 2 is an enlarged, plan view looking down from the top of the phonograph of FIG. 1 after its upper housing has been removed.

Referring now more in particular to FIGS. 2 and 3, motor 140 may be powered by a battery 192 which is housed in a battery compartment 194 provided in lower housing portion 18. Compartment 194 has an open bottom 196 which may be closed by a lid 198 swingably connected to housing portion 18 by a rod 200 (FIG. 3). The positive end of battery 192 engages a contact 202 (FIG. 2) which is connected to a resistance element 203 by a lead 204. The negative end of battery 192 engages a contact 206 in the form a wire bail having a leg 208 connected to a contact 210 in the bottom of housing portion 18 by a lead 212. Contact 210 is normally engaged by one end 214 of an elongated resilient "off" switch 216 having an end 218 staked to bottom wall 66 by a post 220. The "off" switch 216 is connected to an elongated, resilient "on" switch 222 by a lead 224. Switch 222 is staked to bottom wall 66 by a post 226 and includes a free end 228 extending to a position beneath L-shaped member 176 in the path-of-travel of a contact 230 carried by member 176. Contact 230 is connected to motor 140 by a lead 232. Motor 140 is connected to the positive side of battery 192 by a lead 234, a rod 236, a slider 238 and resistance element 203. "Off" switch 216 may be automatically opened by the engagement of switch-opening cam 96 with a lifting lever 239, to be hereinafter described in detail.

Referring now to FIGS. 1–4, stylus-shielding apparatus 14 includes a cover assembly 240 having a central, circular opening 242 and an arcuate opening 244 provided thereon. Cover assembly 240 includes a cover member 246 having a top wall 248 and a side wall 250. Cover member 246 is affixed to cover 240 in encompassing relationship with opening 242. A V-shaped opening 252 (FIGS. 3 and 4) is provided in side wall 250 in alignment with arcuate opening 244.

Cover assembly 240 may be connected to turntable 58 by inserting a pin, like the one shown in 254 in FIGS. 3 and 4, in associated ones of the hollow-cylindrical bosses 78, 80, 82 and 84. This affixes cover assembly 240 to turntable 58 in a position such that stylus 100 will extend through arcuate opening 244 to a position above cover 240.

Stylus-unshielding apparatus 15, which includes a frusto-conical cam 256, is reciprocably mounted to upper end 68 of spindle 60 and to a cylindrical opening 258 in cover member 246 by a hollow stem 260 having a closed end wall 262. Cam 256 is normally biased to the elevated position shown in FIG. 4 by a second compression spring 264 having its upper end 266 engaged in a cylindrical groove 268 provided in cam 256 and having a lower end 270 bearing against the upper end of cylindrical bearing 72 on turntable 58. Cam 256 coacts with a camming surface 272 on tonearm 90 to unshield stylus 100 by moving it out from under cover member 246 when cam 256 is moved downwardly from the position shown in FIG. 4 to the position shown in FIG. 3 by a pin or protuberance 274 depending from recorded-message carrier 12. Camming surface 272 and pin 274 form part of unshielding apparatus 15.

Referring to FIGS. 1, 3 and 4, recorded-message carrier 12 includes a three-dimensional FIG. 276 mounted to a base 278 which carries a phonograph record assembly 280. The three-dimensional FIG. 276 may be molded in two halves and then connected together along a parting line 282 by a suitable adhesive or the like. Pins and sockets like the set shown at 284, 286, respectively, in FIG. 4 may also be used to connect the halves together.

Base 278 includes a depending, cylindrical skirt 288 provided with an outer annular groove 290 and a downwardly, inwardly sloping first chamfer 292. Skirt 288 also includes a second chamfer 294 which slopes upwardly and inwardly to an inner annular groove 296 above which is a circular disc or fixed platform 298 provided with a central aperture 300. Phonograph record assembly 280 includes a circular disc portion 304, on the underside of which a recorded message may be provided, and a central, upstanding dome portion 306 having an encompassing side wall 308 and a top wall 310, from which protuberance 274 depends. Phonograph record assembly 280 may be quickly and conveniently coupled to base 278 because of the second chamfer 294 and a third chamfer 311, which is provided around the outer periphery of disc portion 304.

Figure 7:
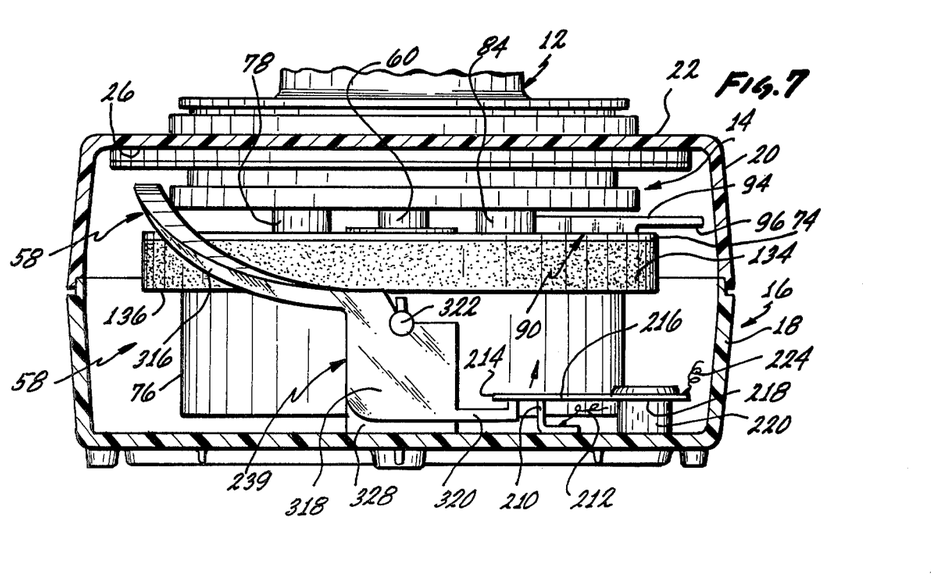
FIG. 7 is an enlarged, cross-sectional view, on an enlarged scale, of the phonograph of FIG. 1 as viewed along line 7—7 of FIG. 2.

Referring now to FIGS. 2, 7 and 8, lifting lever 239 includes an elevated, curved portion 316, an intermediate portion 318 and a switch-lifting finger portion 320. A pair of trunnions 322, 324 are provided on intermediate portion 318 for swingably mounting lever 239 on a pair of brackets 326, 328 affixed to bottom wall 66 adjacent battery compartment 194. Lever 239 may be biased toward turntable 58 by a third compression spring 330 having a first end 332 bearing against battery compartment 194 and a second end 333 bearing against intermediate portion 318. Curved portion 316 partially encompasses turntable 58 in the path-of-travel of switch-opening cam 96 on tonearm 90 and slopes upwardly from intermediate portion 318 to a position above turntable 58. Finger portion 320 extends to a position beneath end 214 of "off" switch 216 for opening switch 216 when cam 96 engages curved portion 316 after stylus 100 has tracked the recorded portion of phonograph record 280 from the inner periphery to the outer periphery thereof. Cam 96 follows the path defined by arrows 334 (FIG. 2) at the end of this tracking operation. Turntable 58 rotates in the direction of arrow 336 and needle 100 follows the path defined by arrow 338 (FIG. 2) during this tracking operation. Lifting lever 239 may be molded as a one-piece unit from suitable polymeric material.

Each housing portion 18, 20 may also be molded as a one-piece unit from polymeric material. As shown in FIG. 2, bottom wall 66 of housing portion 18 carries four upstanding bosses 340, 342, 344, 346 which may be internally threaded to facilitate fastening upper housing portion 20 to lower housing portion 18 by suitable screws (not shown).

The operation of the stylus shielding and unshielding apparatus will now be described. As shown in FIG. 4, when recorded-message carrier 12 is not in position in opening 24, compression spring 130 elevates turntable 58 permitting spring 180 to elevate output shaft 138 sufficiently that contact 230 moves away from "on" switch 222 opening the circuit to motor 140. Compression spring 264 elevates cam 256 away from camming surface 272 so that torsion spring 102 (FIG. 2) will move stylus or needle 100 beneath cover member 246 where needle 100 is shielded from contact by objects passing through opening 24.

Referring now to FIG. 3, recorded-message carrier 12 may be coupled to opening 24 by engaging detents 44, 46, 48 (FIG. 6) in groove 290. First chamfer 292 facilitates the insertion of carrier 12 through opening 24. During this insertion, pin 274 engages top wall 262 on cam 256 causing cam 256 to coact with camming surface 272 and move needle 100 to its unshielded position at the inner periphery of recorded portion 304 of phonograph record 280. At this point, carrier 12 is not fully seated in opening 24, whereby further downward movement of carrier 12 causes record assembly 280 to engage needle 100. This transmits sufficient downward force to turntable 58 to compress spring 130 and swing motor 140 counterclockwise until contact 230 contacts "on" switch 222 closing a circuit to motor 140. Knurled output shaft 138 then rotates drive belt 136 in the direction of arrow 348 to thereby rotate turntable 58.

Rotation of turntable 58 imparts rotation to tonearm 90 causing needle 100 to track the grooves on recorded portion 304 from its inner periphery to its outer periphery. This imparts vibrations to tonearm 90 which transmits vibrations to sound transmitting rod 110. Coupler 118 on rod 110 then vibrates armature 120 which, in turn, vibrates speaker cone 124 for audibly reproducing the message recorded on recorded portion 304.

Referring now to FIG. 2, when tonearm 90 reaches the outer periphery of recorded portion 304, switch-opening cam 96 will follow the path of arrows 334 and exert a downward force on the elevated curved portion 316 of lever 239. This rocks lever 239 on trunnions 322, 324 thereby elevating finger 320. This, in turn, lifts end 214 of "off" switch 216 above contact 210 for breaking the circuit to motor 140 and automatically stopping turntable 58. When recorded-message carrier 12 is then removed from opening 24, cam 256 will be elevated and needle 100 will be returned to their FIG. 4 positions where needle 100 is shielded by cover member 246. Spring 130 will also elevate turntable 58 permitting spring 180 to elevate contact 230 to a switch "open" position. Switch 216 will then be closed on contact 210.

While the particular stylus shielding and unshielding apparatus herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than defined in the appended claims.

I claim:

1. In combination with a phonograph of the type which includes a housing having an opening for receiving a recorded-message carrier, a turntable rotatably mounted in said housing in alignment with said opening, a tonearm pivoted to said turntable for rotation thereby and a reproducing stylus extending upwardly from said tonearm for engaging said recorded-message carrier when it is in position within said opening, the improvement which comprises:

means for automatically shielding said stylus from access through said opening when said recorded-message carrier is removed from said opening; and means for automatically unshielding said stylus when said recorded-message carrier is positioned within said opening.

2. The combination recited in claim 1 wherein said means for automatically shielding said stylus includes:

a cover member;

means for affixing said cover member to said turntable; and means for moving said stylus to a position beneath said cover member when said recorded-message carrier is removed from said opening.

3. The combination recited in claim 1 wherein said means for automatically unshielding said stylus includes:

a first camming member mounted to said shielding means for movement from a first position to a second position;

a second camming member affixed to said tonearm in a position such that said second camming member engages said first camming member when said stylus is being shielded by said shielding means and said first camming member is at rest in one of said first and second positions, said first and second camming members moving said stylus to an unshielded position when said first camming member is moved to the other of said first and second positions; and means for moving said first camming member to said other of said first and second positions during the positioning of said recorded-message carrier in said opening.

4. The combination recited in claim 2 wherein said means for moving said stylus to a position beneath said cover member comprises a spring connected to said tonearm for normally biasing said stylus to a position beneath said cover member.

5. The combination recited in claim 3 wherein said means for moving said first camming member comprises a pin depending from said recorded-message carrier.

6. The combination recited in claim 3 wherein said shielding means includes a cover member, wherein said first camming member is reciprocably mounted to said cover member, wherein said first camming member is biased to said first position by a spring and wherein said recorded-message carrier includes a depending pin adapted to engage said first camming member and move it from said first position to said second position.

7. In combination with a phonograph of the type which includes a housing having a top wall provided with an opening for receiving a recorded-message carrier, a turntable rotatably mounted in said housing in alignment with said opening, a tonearm pivoted to said turntable for rotation thereby and a reproducing stylus extending upwardly from said tonearm for engaging said recorded-message carrier when it is in position within said opening, the improvement which comprises:

(A) means for automatically shielding said stylus from access through said opening when said recorded-message carrier is removed from said opening, said means for automatically shielding said stylus including:

(i) a cover member;

(ii) means for affixing said cover member to said turntable; and (iii) means for moving said stylus to a position beneath said cover member when said recorded-message carrier is removed from said opening;

(B) means for automatically unshielding said stylus when said recorded-message carrier is positioned within said opening said means for affixing said cover member to said turntable comprising:

(i) a cover overlying said turntable above said tonearm, said cover having a circular opening provided at the center thereof and an arcuate opening extending from said circular opening to the outer periphery of said cover, said stylus being adapted to travel in said openings with the exposed tip of said stylus extending to a position above said cover, said cover member having a top wall and a depending sidewall, said depending sidewall being affixed to said cover in encompassing relationship with said circular opening, said depending sidewall being provided with an inverted U-shaped opening in communication with said arcuate opening for permitting said stylus to pass from said arcuate opening into said circular opening to a position beneath said top wall portion of said cover member; and (ii) a plurality of pin-type connectors depending from said cover for connecting said cover to said turntable.

8. In combination with a phonograph of the type which includes a housing having a top wall provided with an opening for receiving a recorded-message carrier, a turntable rotatably mounted in said housing in alignment with said opening, a tonearm pivoted to said turntable for rotation thereby and a reproducing stylus extending upwardly from said tonearm for engaging said recorded-message carrier when it is in position within said opening, the improvement which comprises:

(A) means for automatically shielding said stylus from access through said opening when said recorded-message carrier is removed from said opening; and (B) means for automatically unshielding said stylus when said recorded-message carrier is positioned within said opening, said recorded-message carrier comprising:

(i) a disc having a message recorded thereon, said disc having a central opening;

(ii) a side wall encompassing said opening;

(iii) a top wall closing the upper end of said sidewall; and (iv) a pin depending from said top wall, said pin forming a portion of said means for automatically unshielding said stylus.

9. The combination recited in claim 8 wherein said recorded-message carrier includes:

a three dimensional figure including a base portion having a depending, cylindrical skirt provided with a first annular groove and a first chamfer sloping downwardly and inwardly on the lower end of said skirt for facilitating the coupling of said figure to said opening in said housing, said cylindrical skirt also being provided with a second chamfer sloping upwardly and inwardly from said lower end of said cylindrical skirt to a second annular groove;

a partition affixed to the inside of said cylindrical skirt above said second annular groove, said partition being provided with an aperture;

a third chamfer provided on said disc, said third chamfer sloping downwardly and outwardly around the outer peripheral of said disc for coating with said second chamfer and said second annular groove for coupling said recorded-message carrier to said cylindrical skirt; and a plurality of detents mounted to said top wall of said housing adjacent said housing opening for engaging said first annular groove to couple said recorded-message carrier to said housing.

* * * * *